June 8, 1965  A. DENNER  3,187,791
PEELING AND CORING MACHINE
Filed Nov. 2, 1962  7 Sheets-Sheet 1

INVENTOR
August Denner
BY Walter G. Finch
ATTORNEY

June 8, 1965 A. DENNER 3,187,791
PEELING AND CORING MACHINE
Filed Nov. 2, 1962 7 Sheets-Sheet 2
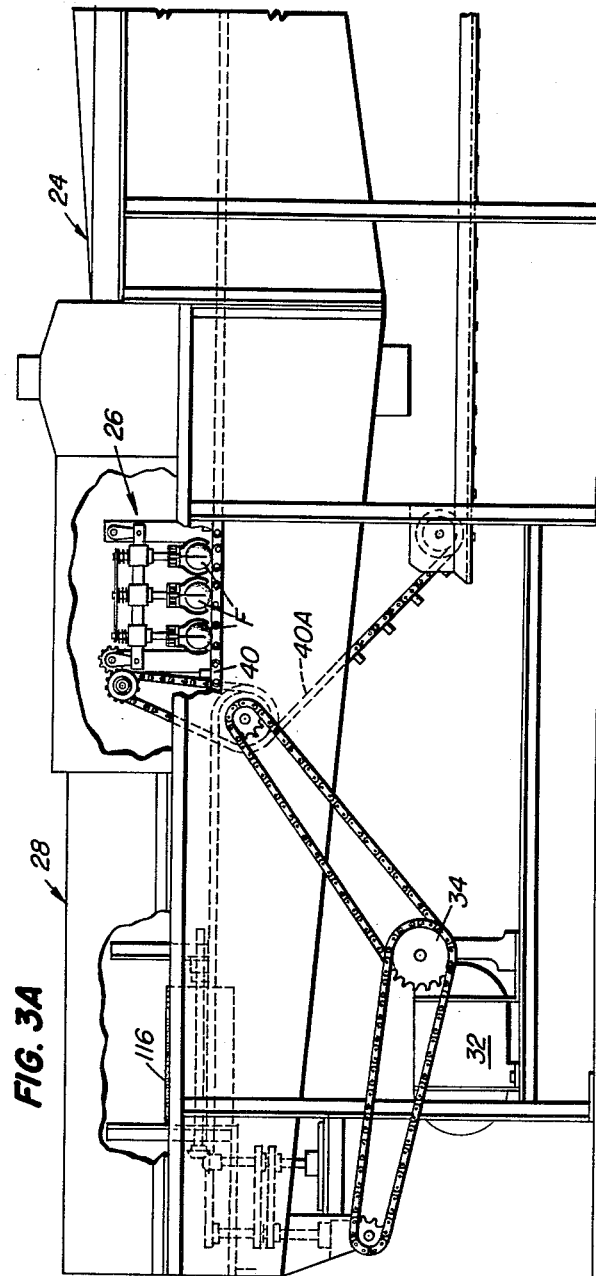
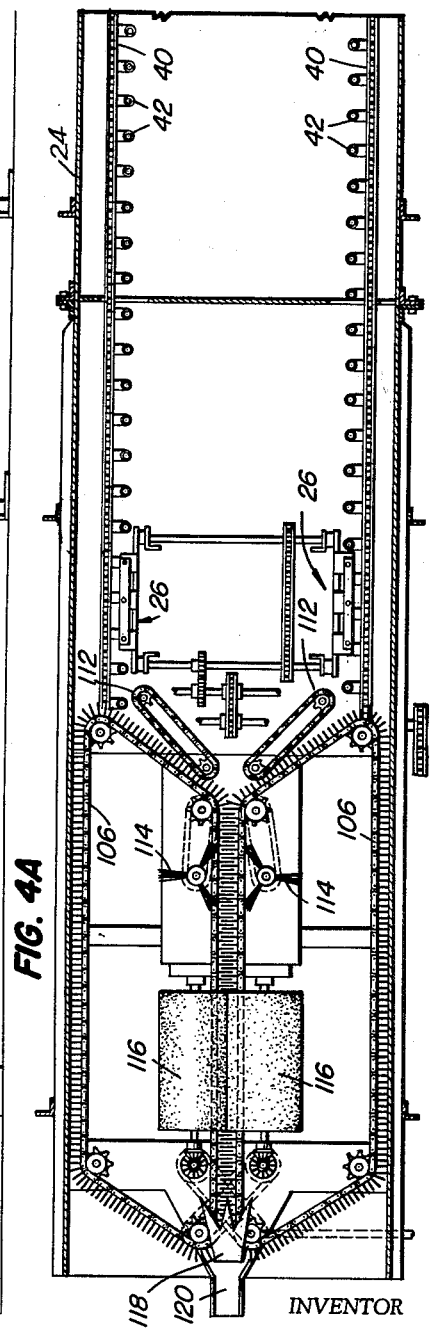
INVENTOR
August Denner
BY Walter G. Finch
ATTORNEY June 8, 1965 A. DENNER 3,187,791
PEELING AND CORING MACHINE
Filed Nov. 2, 1962 7 Sheets-Sheet 3
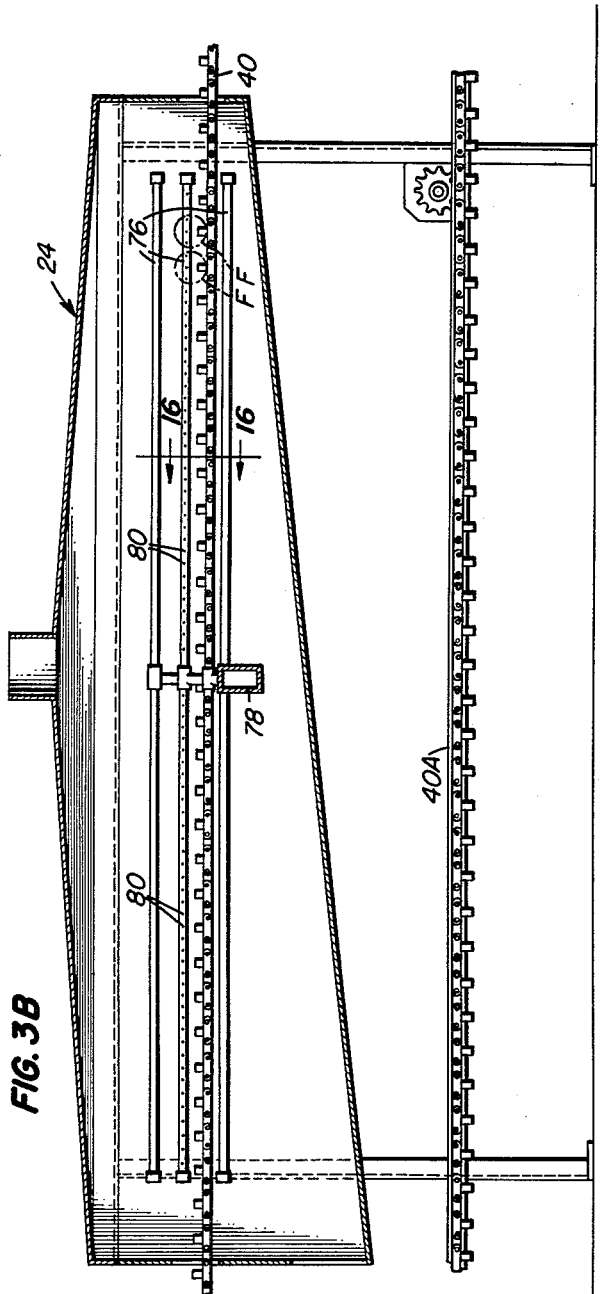
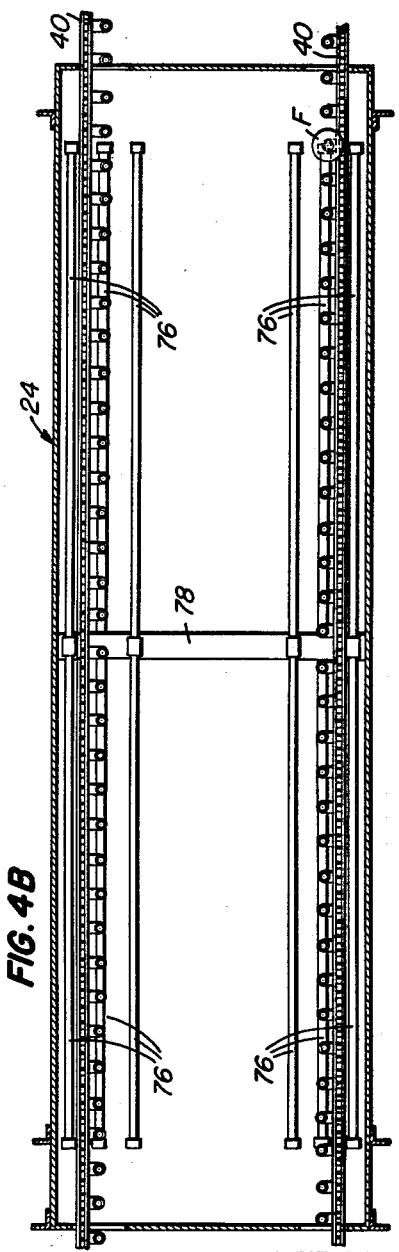
INVENTOR
August Denner
BY Walter G. Finch
ATTORNEY June 8, 1965
A. DENNER
3,187,791
PEELING AND CORING MACHINE
Filed Nov. 2, 1962
7 Sheets-Sheet 4
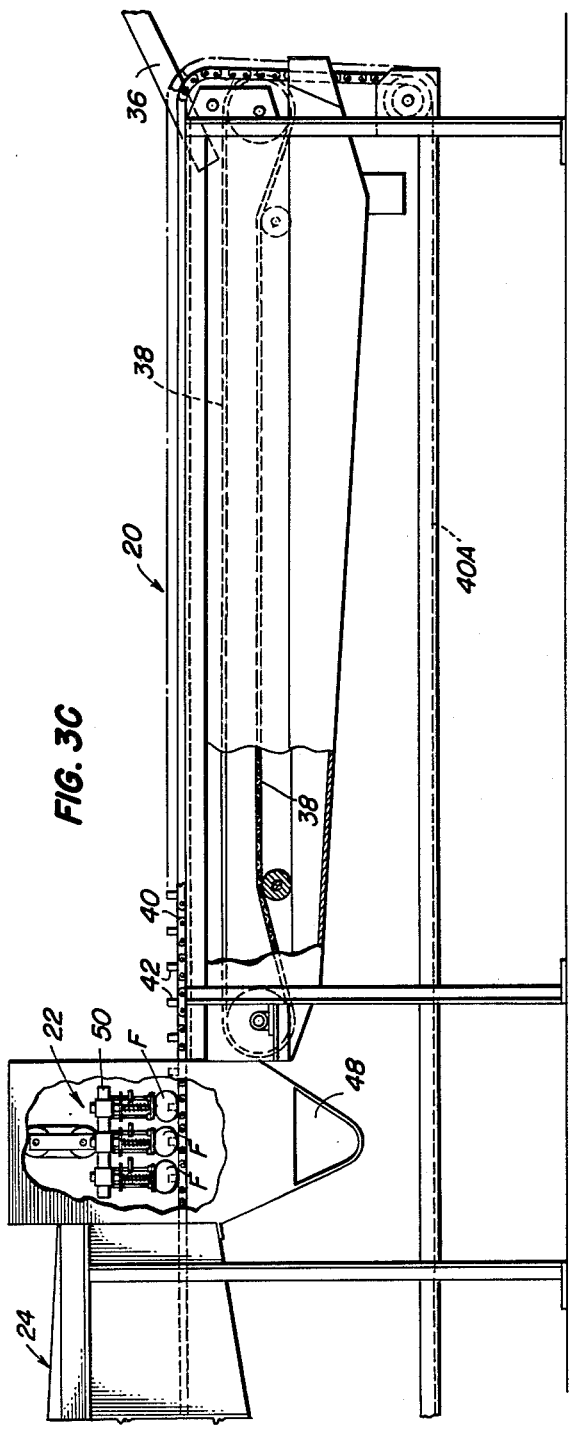
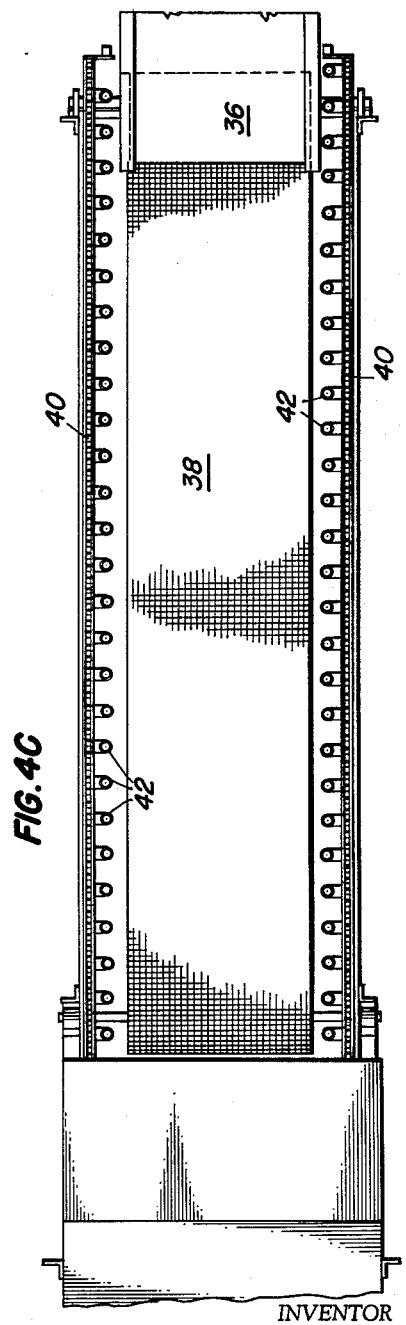
INVENTOR
*August Denner*
BY *Walter G. Finch*
ATTORNEY

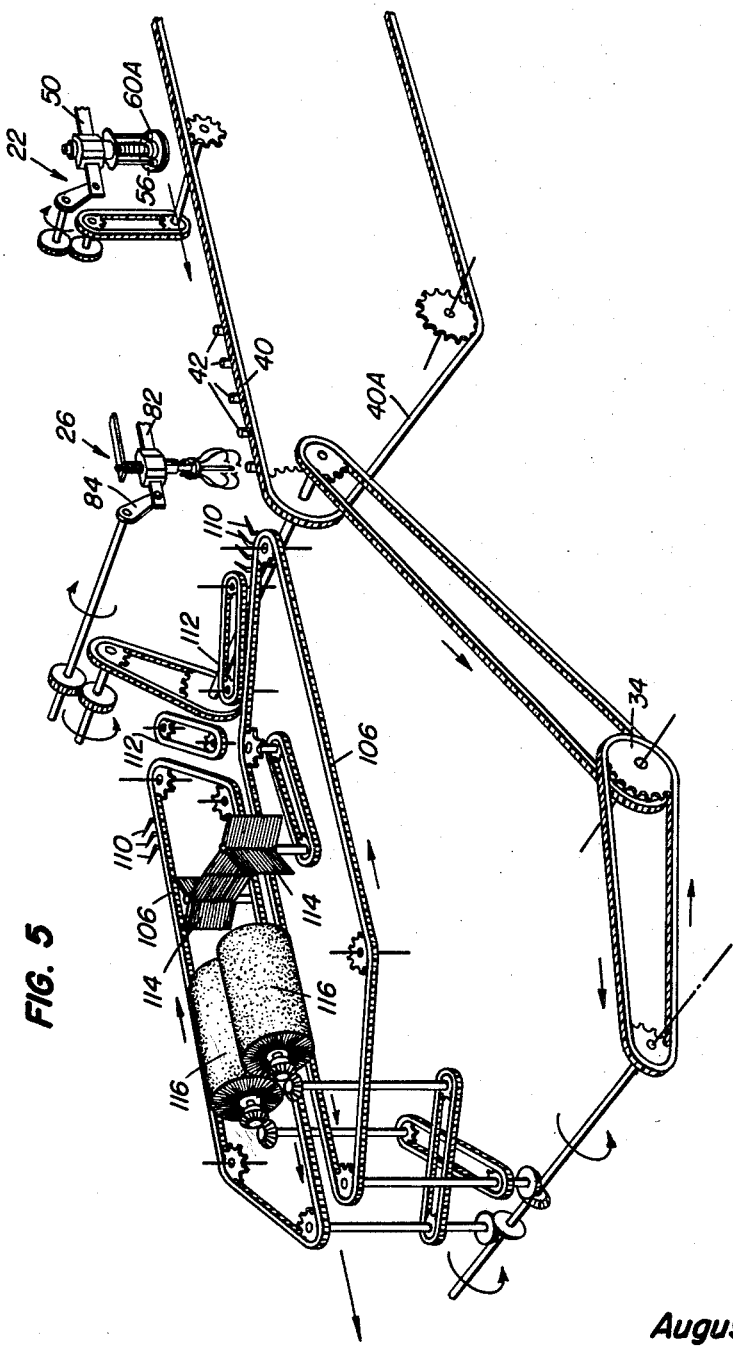

June 8, 1965 A. DENNER 3,187,791
PEELING AND CORING MACHINE
Filed Nov. 2, 1962 7 Sheets-Sheet 6
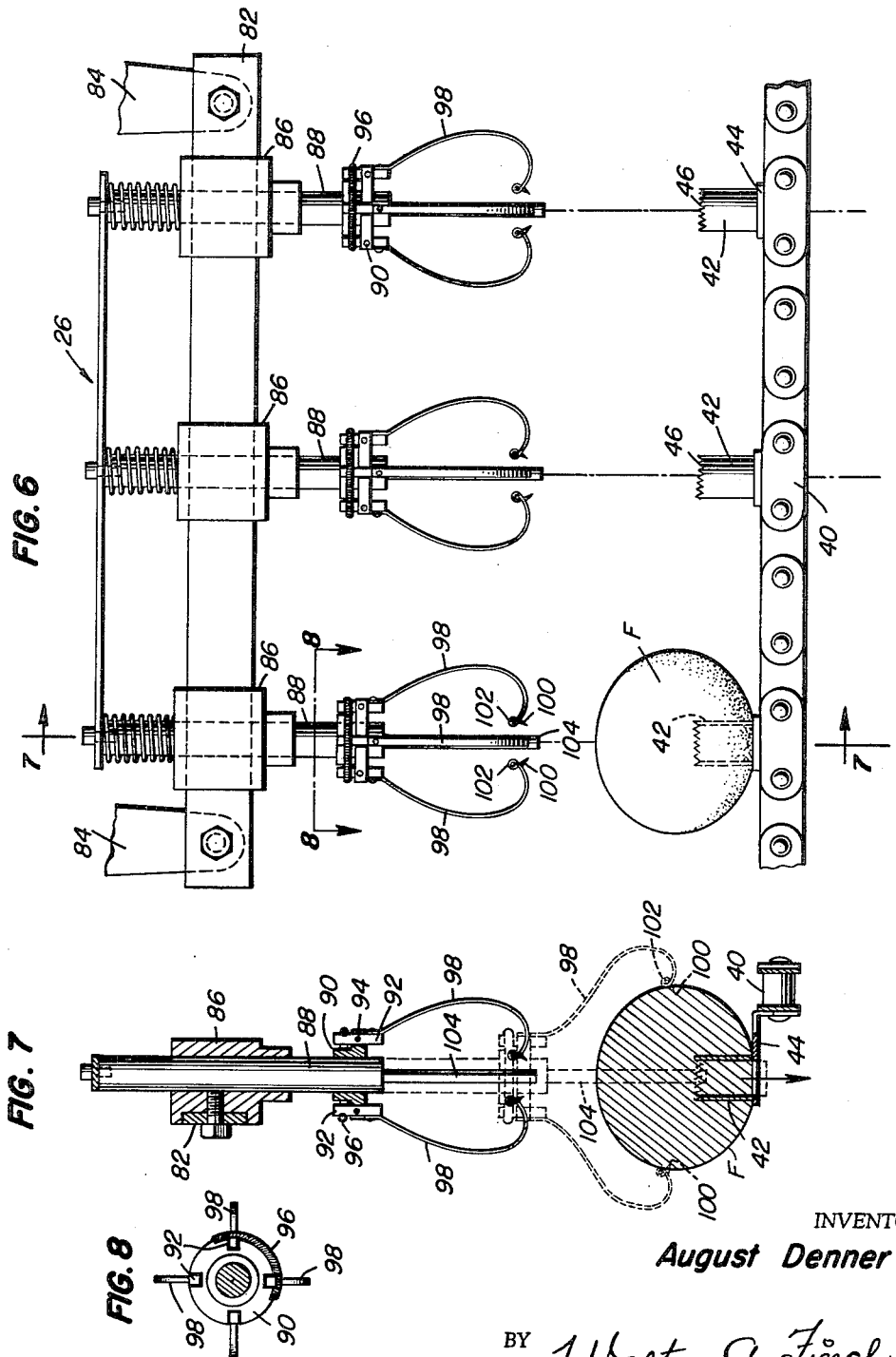
INVENTOR
*August Denner*
BY *Walter G. Finch*
ATTORNEY

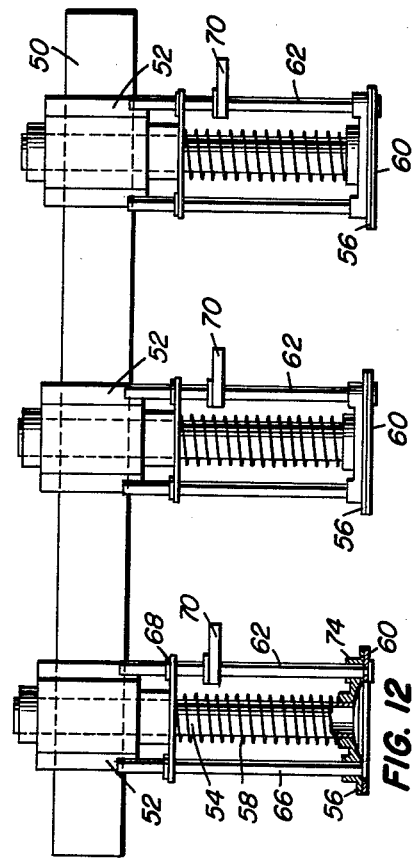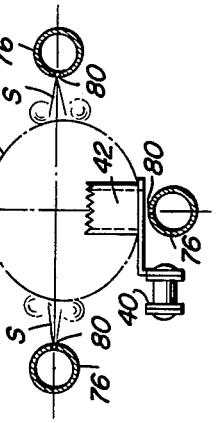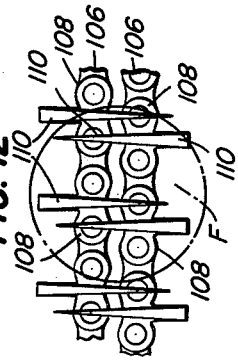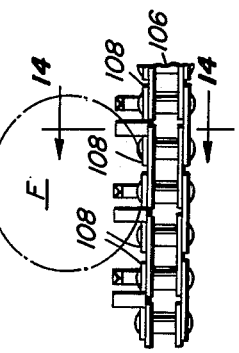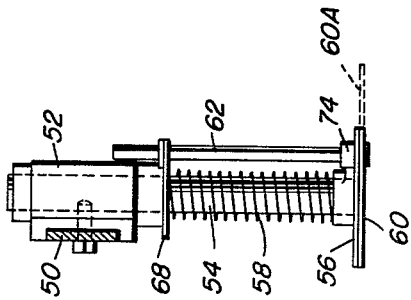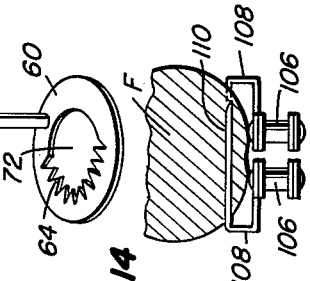
INVENTOR
August Denner
BY Walter J. Finch
ATTORNEY United States Patent Office 3,187,791
Patented June 8, 1965

3,187,791
PEELING AND CORING MACHINE
August Denner, 16 Edmondson Ridge Road,
Baltimore 28, Md.
Filed Nov. 2, 1962, Ser. No. 234,941
4 Claims. (Cl. 146—43)

This invention relates generally to vegetable cutters, and more particularly it pertains to a machine for coring and peeling soft fruit having thin and tender skins, such as tomatoes.

It is an object of this invention, therefore, to provide a machine for automatically preparing tomatoes at a high rate for packing whole in cans. From the time the fruit is inspected and loaded on the machine, the blossom ends are trimmed, the skins scalded and slit, the cores and skins are removed and the green ends trimmed or cat faced all without further manual attention.

Another object of this invention is to provide a new and improved fruit preparation machine which performs synchronized operations on the fruit during continuous smooth transit thereof so as to reduce handling damage.

To provide a combination fruit aligner and blossom cutter, is a further object of this invention.

To provide a single stroke corer and skin slitter, is still another object of the invention.

Another object of this invention is to provide a continuous flow machine which scalds fruit, rips the blistered skin and tears it off without harming the pulp.

Still another object of this invention is to provide a fruit coring, peeling and trimming machine which efficiently handles all fruit regardless of size or shape.

Other objects and attendant advantages of this invention will become more readily apparent and understood from the following detailed specification and accompanying drawings in which:

FIG. 3A is an enlarged view, partly in section and partly broken away, of the left or discharge end of the machine taken on line 3A—3A of FIG. 1;

FIG. 3B is a view similar to FIG. 3A taken on line 3B—3B of FIG. 1 illustrating the center portion of the machine;

FIG. 3C is a view similar to FIG. 3A taken on line 3C—3C of FIG. 1 illustrating the loading end of the machine;

FIG. 4A is an enlarged horizontal section of the left or discharge end of the machine of FIG. 1 taken on line 4A—4A of FIG. 2;

FIG. 4B is a view of the center portion of the machine similar to FIG. 4A and taken on line 4B—4B of FIG. 2;

FIG. 4C is a view similar to FIG. 4A taken on line 4C—4C of FIG. 2;

FIG. 5 is a perspective schematic depiction of the elements of the peeling and coring machine of this invention;

FIG. 6 is an enlarged front elevation illustrating details of a corer and skin slitter assembly;

FIG. 7 is a vertical section taken on line 7—7 of FIG. 6 showing the fruit engagement position in dashed lines;

FIG. 8 is a horizontal section taken on line 8—8 of FIG. 6;

FIG. 9 is a right side elevation of an aligner and blossom cutter showing the action of the blossom cutter knife in dashed lines;

FIG. 10 is a front elevation of the aligner and blossom cutter assembly;

FIG. 11 is a perspective depiction of a blossom cutter knife;

FIG. 12 is a plan view of a portion of the merged holding chains showing the action of the prong links in supporting the fruit;

FIG. 13 is a side elevation of the same;

FIG. 14 is an end view of the same taken on line 14—14 of FIG. 13;

FIG. 15 is an enlarged perspective detail view of one of the prong links; and

FIG. 16 is a vertical section view 16—16 of FIG. 3B in the direction of feed chain travel depicting the fruit scalding arrangement.

Figure 1:
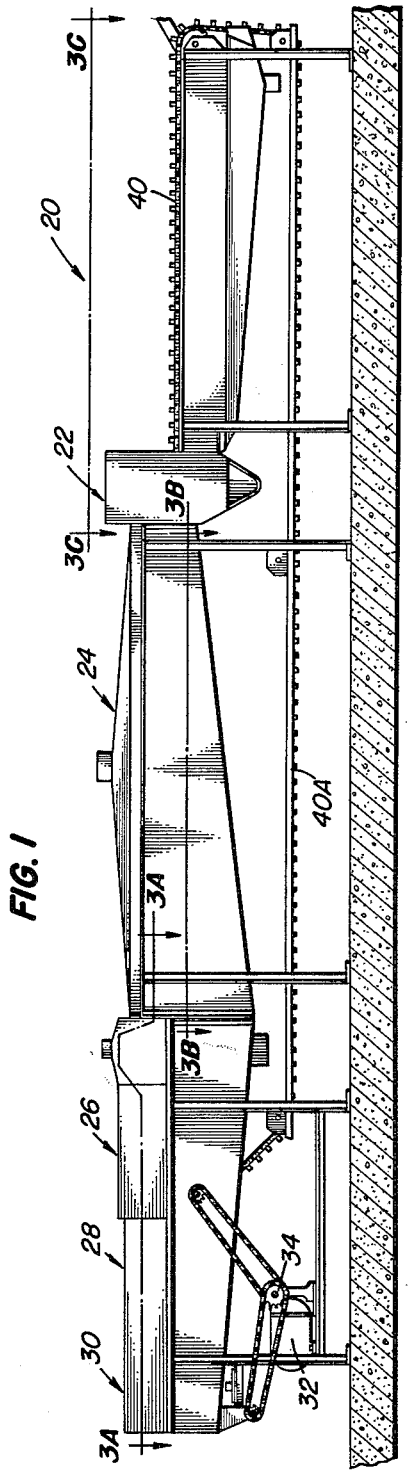
FIG. 1 is a side elevation of a peeling and coring machine embodying features of this invention.
Figure 2:
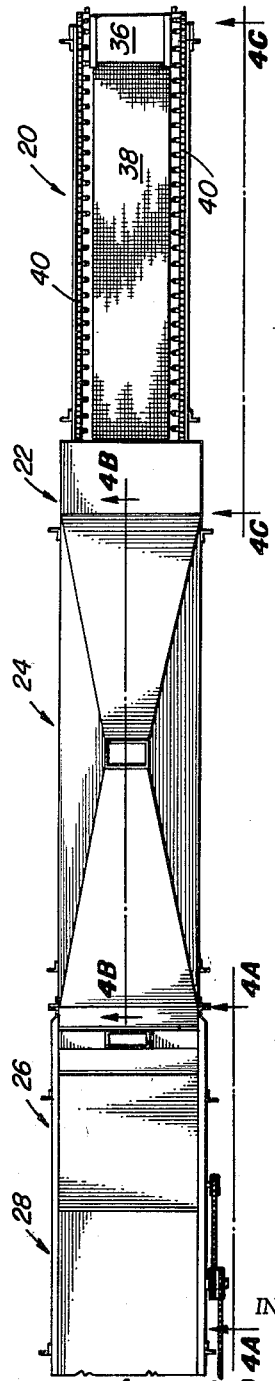
FIG. 2 is a plan view of the machine shown in FIG. 1.

Referring now to the details of the drawings as shown in FIGS. 1 and 2 from right to left the peeling and coring machine consists generally of a loading station 20, a blossom cutter 22, a scalding box 24, a slitter and corer 26, a skin remover 28 and at the very left or discharge end a green end or "cat facing" cutter 30.

A motor 32 having a drive wheel 34 operates the entire machine with complete synchronism between the various elements being assured by use of non-slipping corrugated belting or chain drives on sprockets.

A loading chute 36 is positioned at one end of the loading station 20 and discharges a store of fruit such as tomatoes upon an endless moving carrier belt or conveyor 38 for easy inspection.

An endless feed chain 40 is mounted at each side of the conveyor 38 and extends nearly the entire length of the machine traversing the blossom cutter 22, the scalding box 24 and the splitter and corer 26 as it moves before returning underneath the conveyor as indicated by reference numeral 40A. Occasional reference to FIG. 5 is suggested as now the operation of the machine will be related and the various elements are described.

As best shown in FIGS. 3C and 4C and the lower halves of FIGS. 6 and 7, the feed chains 40 are provided with equally spaced tubular core removers 42 each mounted on an overhanging bracket 44. The top edges 46 of the core removers 42 are serrated and sharpened so that fruit F taken from conveyor 3B may easily be impaled, stem side down, thereon by operators standing at the loading station 20.

Any fruit rejected by the operators is carried by the conveyor 38 over its left end and deposited in a waste hopper 48 beneath the blossom cutter 22 as best shown by FIG. 3C.

This blossom cutter 22 consists of a pair of oscillating sweep beams 50, one over each feed chain 40. As best shown in FIGS. 9 and 10, three housings 52 are secured to each sweep beam 50 and spaced with the same intervals as the core removers 42 of the feed chains 40. Each housing 52 is vertically bored to slidably receive a plunger 54. The lower end of plunger 54 is secured to a concave receptacle plate 56. A compression coil spring 58 urges plate 56 downwardly to the limit of a suitable stop at the top end of plunger 54.

A blossom cutter knife 60 of annular disk shape having a central aperture 72 is secured to a vertical shaft 62 as best shown in FIG. 11. The inner periphery of disk 60 has sharpened serrations 64.

A vertical guide rod 66, which is attached to plate 56, is slidably received in a guide plate 68 attached to housing 52 and prevents receptacle plate 56 from rotating. Shaft 62 is also slidably journalled in guide plate 68 after passing through a journal 74 in the plate 56. By means of a collar or pin (not shown), the blossom cutter knife 60 is held against the bottom of plate 56 yet with freedom to swing edgewise as shown at reference 60A.

When sweep beam 50 is caused to oscillate vertically in a circular path by crank means, subsequently to be described, at the uppermost portion of its excursion, the plungers 54 are extended and the knife 60 is co-axial with the concavity of plate 56. As the beam 50 sweeps down it causes the three concave plates 56 (as exposed through annular knives 60) to press down upon three fruits moving beneath upon feed chain 40 and to maintain pressure thereon as the sweep motion continues somewhat past lower center. Thus each fruit is accurately and securely positioned on its core remover 42 of chain 40.

During the fruit contacting portion of the sweep, a cutting action also takes place. By projecting means (not shown) on the framework of the machine, a cam 70 extending from shaft 62 causes a rotation of knife 60 therearound.

Since the blossom end of the fruit extends through the aperture 72 at this time, it is sliced off by the serrations 64 and drops down into the previously mentioned waste hopper 48.

The scalding box 24 next on the line of travel of the fruit consists of a long hooded enclosure with a vent. A plurality of apertured steam pipes connected with a steam manifold 78 are arranged in groups of four extending along and spaced from the feed chain 40 as shown in FIGS. 3B and 4B.

Sufficient space is allowed for the travel of fruit within each group as shown in FIG. 16 and small apertures 80 in pipes 76 inwardly directed toward the fruit F eject jets of steam S on the top, bottom and sides thereof to cause a raised blistering of the skin.

After leaving the scalding box 24, the fruit on each chain 40 encounter the slitter and corer 26 best shown in FIG. 6. This assembly incorporates a sweep beam 82 similar to sweep beam 50 of the blossom cutter 22 previously described and in like manner is oscillated in a vertical circular path by crank arms reference numeral 84.

Upon each sweep beam 82, there are mounted three housings 86 which slidably carry a tandem array of three spring supported plungers 88. Each plunger 88 as best shown in FIG. 7 mounts a shaft-like corer 104 coextensive on its lower end. Also secured on the lower end of plunger 88 is a circular spring holder 90, as best illustrated in FIG. 8. This holder is notched on four sides to receive vertically elongated blocks 92 therein pivoted intermediate their ends on pins 94. A core spring 96 encircles the top ends of the four blocks 92 and is there retained in suitable notches. Thus, each block 92 can be tilted a small amount independently of the other three.

A flat skin slitter spring 98 is secured flatwise to each block 92 and is formed downwardly in an inverted half heart-shaped curve. The lower end of the spring 98 is formed into a small smooth loop 102. Just below this loop 102 on spring 98, there is affixed an inwardly projecting short sharp point 100.

As the sweep beam 82 is oscillated in a downward direction, the corer 104 enters the fruits moving upon the feed chain 40 beneath as best shown by the dashed lines of FIG. 7. At the same time the points 100 near the ends of springs 98 enter the steam-loosened skins and move downwardly in a ripping action.

The smooth loops 102 prevent penetration of the points 100 into the flesh of the fruit and the resilience of the springs 98 and 96 allow the contour of the fruit to be followed to the very bottom thereof where impaled on the core remover 42. The continued movement downward also forces the core remover 104 to punch out the central core of the fruit and eject it through the hollow center of core remover 42 as shown by the arrow.

As the sweep beam 82 moves in its upward cycle, the springs 98 and core remover 104 are retracted upwardly and disengage with the fruit.

Referring now to FIGS. 3A and 3B, the fruits on the two feed chains 40, it will be noted, are alternately spaced relatively there-between by a phase displacement of the core removers 42 which hold them. Consequently, firuit can now be fed into a common channel without colliding with each other. For this purpose, they are transferred to a pair of holding chains 106 which converge upon the center of the machine in the area of skin remover 28.

As shown in detail in FIG. 15, the top links of the holding chains are special prong links 108 having long slender sharp points 110 which extend re-entrantly in one horizontal direction across and considerably beyond each chain 106.

Thus when the two chains 106 converge to parallelism as shown in FIGS. 13, 14 and 15, the points 110 intermesh with their opposite chain counterpart points 110 and hold a fruit from both sides. Elsewhere the points 110 extend like teeth of a comb except where rounding a sprocket at an acute angle. Here the points 110 widely separate at their tips and readily impale a fruit which is beginning to descend over the left end of the feed chain 40 where it becomes reference 40A. (See FIGS. 3A and 4A.)

Now the fruits, transferred from riding upon the blossom cutters 22 of feed chains 40 to riding on the points 110 of the holding chains 106 are more firmly impaled and also aligned by guide belts 112 and passed to the median line of the machine.

Firmly held from both sides on meshed points 110 as related in connection with FIGS. 13, 14, and 15, each fruit F is exposed to a pair of vertical whirling multiple fingers 114 which may be hooked at their ends if desired to better catch the ripped edges of the fruit skins and tear them off.

The particles of skin which may remain on the fruit are next removed as it passes between a pair of horizontal revolving cylinder brushes 116. The scrubbing action is improved by a spray of hot water from overhead pipes, not shown, in this area.

Finally the peeled and cored fruit is forced against a low-positioned horizontal catfacer knife 118 to trim off the hard green lower end and the holding chains 106 separate to withdraw the prongs from the finished fruit and drop it on a discharge chute 120 for inspection and packing in cans.

Obviously many modifications and variations of the present invention are possible in light of the above teachings. It is, therefore, to be understood that within the scope of the appended claims the invention may be practiced otherwise than as specifically described.

What is claimed is:

1. A peeling and coring machine, comprising, a first and a second serially arranged pair of conveyor means, a plurality of equally spaced upwardly extending tubular core removers positioned on said first conveyor means upon which fruit is loaded by impalement at a loading station, means including a blossom cutter for said fruit in the line of travel of said first conveyor means after said loading station for accurately and securely positioning each article of fruit on its respective core remover and for blossoming thereof, means in the line of travel of said first conveyor means after said blossom cutter for scalding said fruit, means in the line of travel of said first conveyor means after said scalding means for slitting and coring said scalded fruit, and a transfer zone consisting of the depending end of said first conveyor means and the starting end of said second conveyor means, with said second conveyor means having a plurality of spaced elements for impaling the fruit at said depending end to transfer said fruit from the core removers of said first conveyor means to said second conveyor means.

2. A peeling and coring machine, comprising, a first and a second serially arranged pair of conveyor means, a plurality of equally spaced upwardly extending tubular core removers positioned on said first conveyor means along the direction of movement thereof upon which fruit is loaded by impalement at a loading station, means including a blossom cutter for said fruit in the line of travel of said first conveyor means after said loading station for accurately and securely positioning fruit upon said core removers and blossoming thereof, means in the line of travel of said first conveyor means after said blossom cutter for scalding said fruit, means in the line of travel of said first conveyor means after said scalding means for slitting and coring said scalded fruit, a transfer zone consisting of the depending end of said first conveyor means and the starting end of said second conveyor means, with said second conveyor means having a plurality of spaced elements for impaling the fruit at said depending end to transfer said fruit from the core removers of said first conveyor means to said second conveyor means, whirling multiple fingers arranged next in the line of travel of said second conveyor means for removing the skin of said fruit, and means to whirl said fingers.

3. A peeling and coring machine, comprising, a first and a second serially arranged pair of conveyor means, a plurality of equally spaced upwardly extending core removers positioned on said first conveyor means along the direction of movement thereof upon which fruit is loaded by impalement at a loading station, means including a blossom cutter for said fruit in the line of travel of said first conveyor means after said loading station for accurately and securely positioning said fruit on its respective core removers and for blossoming thereof, means in the line of travel of said first conveyor means after said blossom cutter for scalding said fruit, means in the line of travel of said first conveyor means after said scalding means for slitting and coring said scalded fruit, a transfer zone consisting of the depending end of said first conveyor means and the starting end of said second conveyor means, with said second conveyor means having a plurality of spaced elements for impaling the fruit at said depending end to transfer said fruit from the core removers of said first conveyor means to said second conveyor means, whirling multiple fingers arranged next in the line of travel of said second conveyor means for removing the skin of said fruit, a spaced pair of revolving cylinder brushes in the line of travel of said second conveyor means after said whirling multiple fingers, and a fixed catfacer knife means to receive, remove and catface the fruit from the said second conveyor means whereby fruit is prepared for canning.

4. A peeling and coring machine, comprising, a first and a second serially arranged pair of endless chain conveyors, a plurality of equally spaced upwardly extending core tubular core removers positioned on said conveyors along the direction of movement thereof upon which said fruit is loaded by impalement at a loading station, a blossom cutter for said fruit in the line of travel of said first conveyor after said loading station for accurately and securely positioning said fruit upon the core removers and blossoming thereof, a scalding box in the line of travel of said first conveyor after said blossom cutter for scalding said fruit, slitting and coring means in the line of travel of said first conveyor after said scalding box for slitting and coring said scalded fruit, a transfer zone consisting of the depending end of said first conveyor and the starting end of said second conveyor, with said second conveyor having a plurality of spaced elements for impaling the fruit at said depending end to transfer said fruit from the core removers of said first conveyor to said second conveyor, whirling multiple fingers arranged next in the line of travel of said second conveyor for removing the skin of said fruit, means to whirl said fingers, a spaced pair of revolving cylinder brushes in the line of travel of said second conveyor after said whirling multiple fingers, and a fixed catfacer knife means to receive, remove and catface the fruit from the said second conveyor whereby fruit is prepared for canning.

References Cited by the Examiner
UNITED STATES PATENTS

| 1,252,322 | 1/18 | Cooley | 146—47 |
| 1,347,385 | 7/20 | Kirino. | |
| 1,581,071 | 4/26 | Lowe | 146—47 |
| 1,750,414 | 3/30 | Lewis | 146—52 X |
| 1,992,995 | 3/35 | Denner et al. | 146—43 |
| 3,036,612 | 5/62 | Wilkerson | 146—52 |

J. SPENCER OVERHOLSER, *Primary Examiner.*